Figure 1:
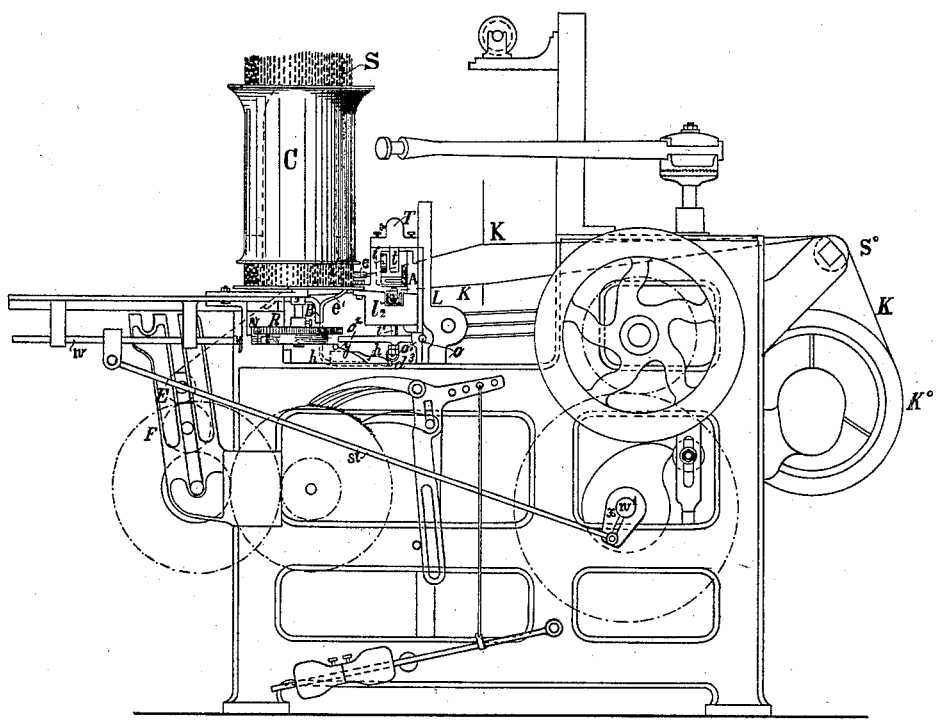

(No Model.) 4 Sheets—Sheet 1.
P. DE HEMPTINNE.
LOOM FOR WEAVING UNSPUN PLANT STALKS.
No. 399,745. Patented Mar. 19, 1889.

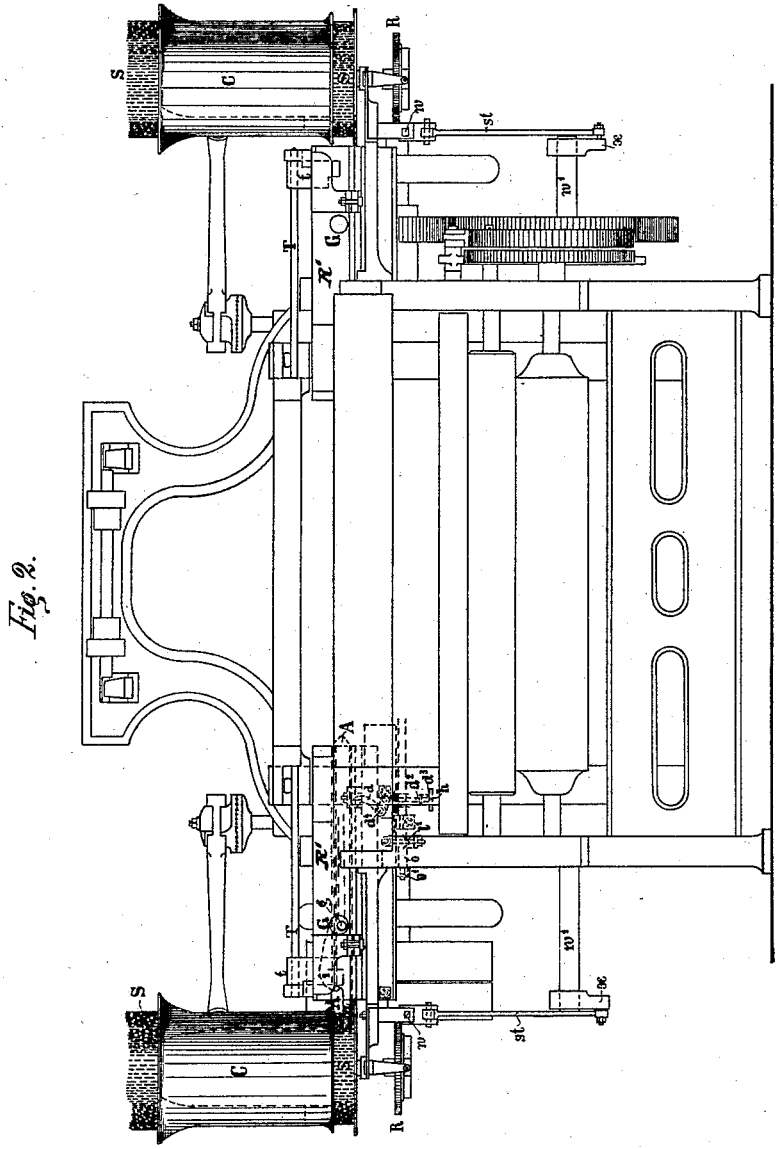

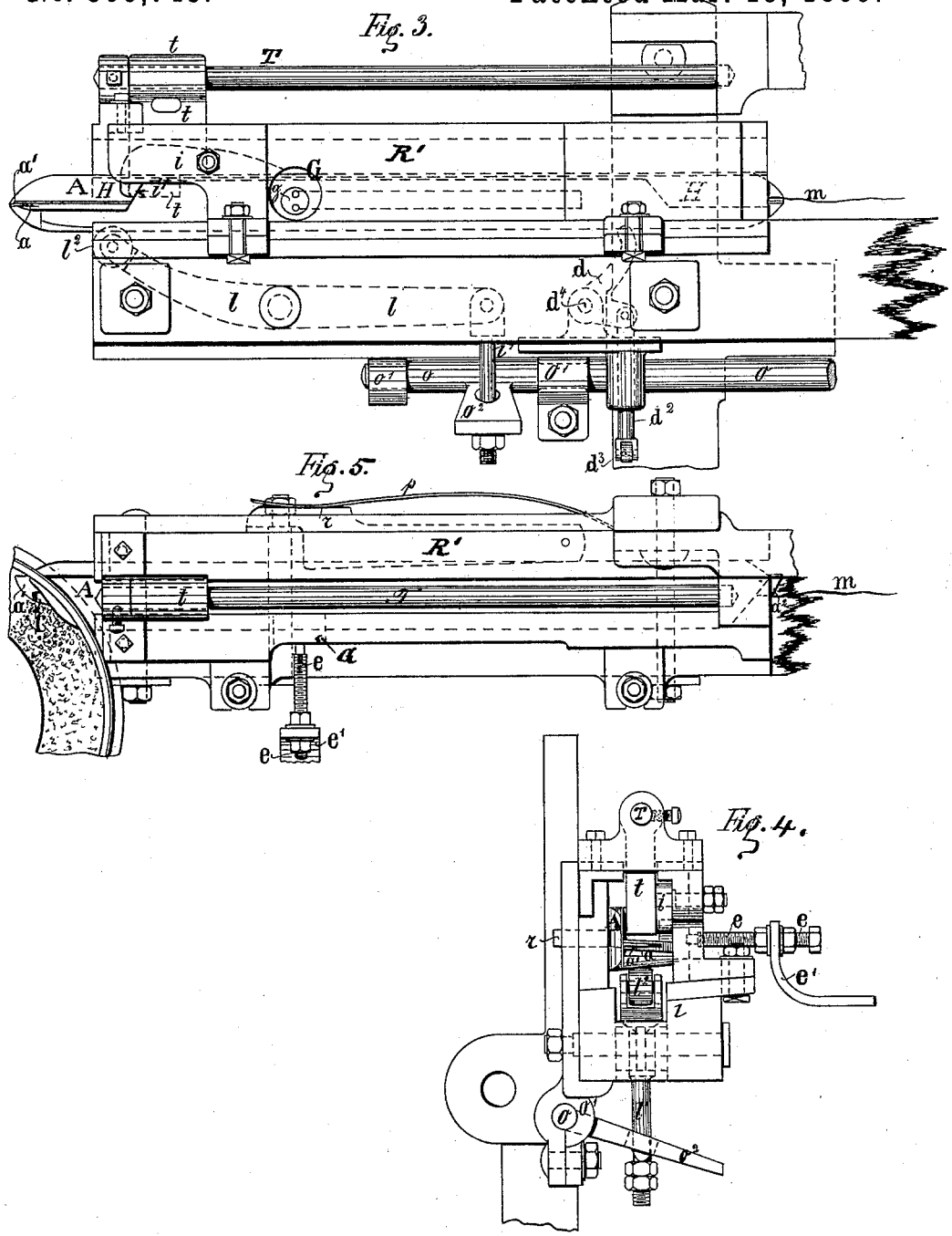

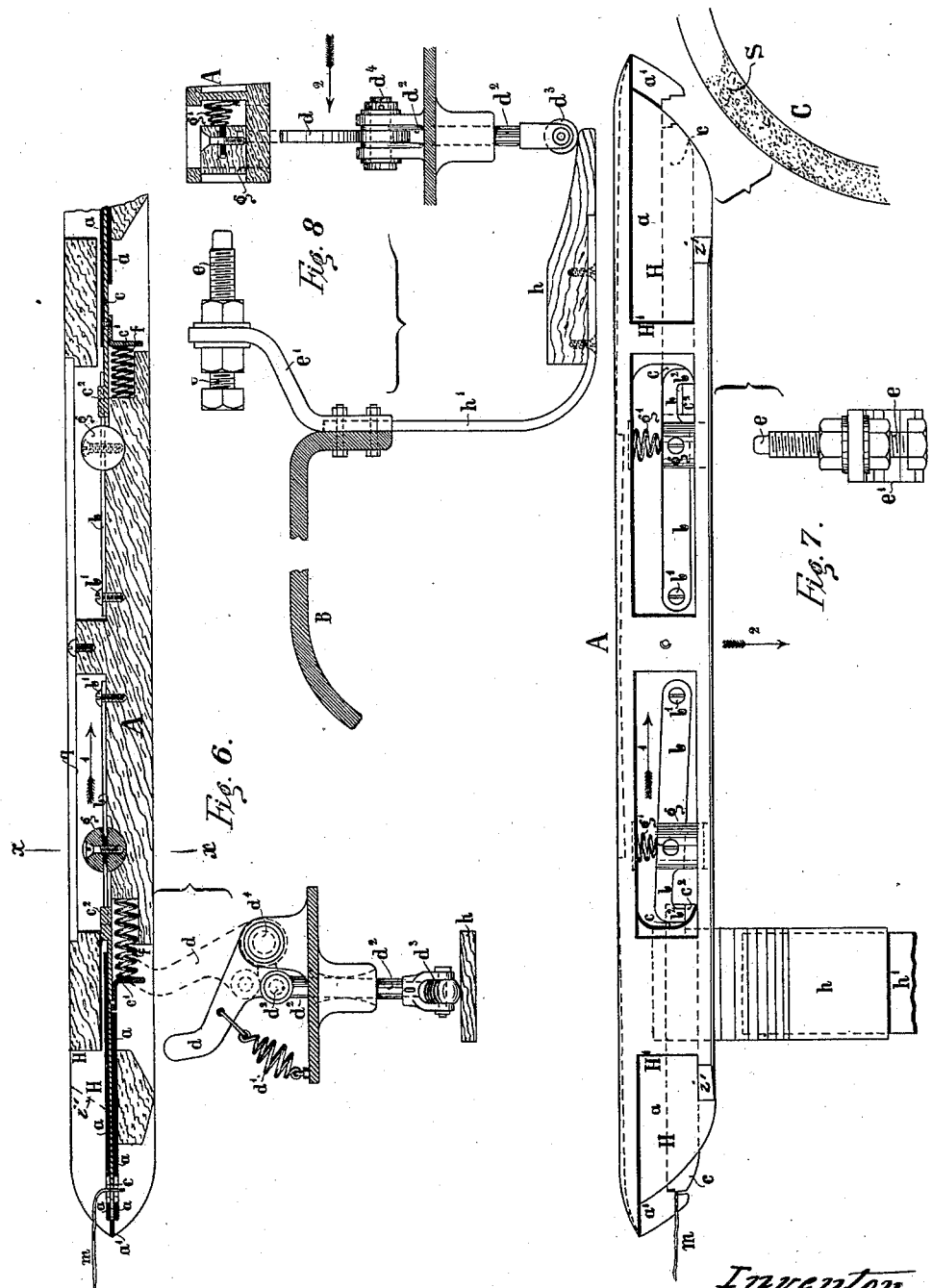

UNITED STATES PATENT OFFICE.

PAUL DE HEMPTINNE, OF GHENT, BELGIUM, ASSIGNOR TO THE FLACHSTUCH-GESELLSCHAFT, OF COLOGNE, PRUSSIA, GERMANY.

LOOM FOR WEAVING UNSPUN PLANT-STALKS.

SPECIFICATION forming part of Letters Patent No. 399,745, dated March 19, 1889.

Application filed July 14, 1886. Serial No. 208,044. (No model.)

*To all whom it may concern:*

Be it known that I, PAUL DE HEMPTINNE, a resident of Ghent, in the Kingdom of Belgium, have invented certain new and useful Improvements in Looms for Weaving Unspun Plant-Stalks, of which the following is a specification.

My invention relates to devices applied to power-looms for effecting the introduction of unspun plant-stalks in the fabric in place of ordinary weft. The said mechanism is of such a nature as to be capable of application to any ordinary construction of loom.

The invention consists of the various features of improvements more fully pointed out in the claims.

In the accompanying drawings, Figure 1 represents a side view of an ordinary loom, illustrating the manner of reducing my invention to practice. Fig. 2 shows a front view of the same. Fig. 3 is a front view of the shuttle-box and stop-motion on an enlarged scale. Fig. 4 is an end view of the same. Fig. 5 is a plan of the same, together with part of the stalk-box. Fig. 6 represents a longitudinal section of part of the shuttle and front view of mechanism for actuating the gripper. Fig. 7 is a top view of the same. Fig. 8 is a side view of mechanism for actuating the gripper and cross-section of the shuttle, as on line $x\,x$ of Fig. 6.

The invention has for its object the introduction into an ordinary warp operated in the usual manner of a weft consisting of separate stems or stalks of plants having a length equal to that of the width of the fabric to be produced.

An annular receptacle or box, C, carried by the breast-beam, or an extension thereof, and rotatable on its vertical central axis, is placed on each side of the machine, and contains in its annular space the stalks S in such a manner that their lower ends project somewhat beyond the bottom of the outer casing of the box. The box is so arranged that the shuttle A, when in the shuttle-box, projects with its beak somewhat beyond the latter, and in among the stalks in said stalk-box when the lathe is beating up or in its most forward position, and in which position of the shuttle its gripper-jaws are opened, as hereinafter described. The grippers of the shuttle A (which are alike at both ends) consist essentially of a plate, $a'$, screwed to the body of the shuttle and provided with a hook or notches, and of a plate, $c$, moving horizontally between plates $a\,a$, attached to the shuttle, and which constitutes the movable jaw of the gripper. The plate $c$ has a projection, $c'$, against which a spring, $f$, presses, tending to close the gripper $a'\,c$. As long as the gripper is not in action this plate $c$ is held back, so as not to close the gripper by a catch, $b$, in contact with a stud or projection, $c^2$, on top of plate $c$. (See Figs. 7 and 8.) This catch $b$ will be kept in position by the action of spring $g'$. In Fig. 8, on the right hand, the position of plate $c$ and catch $b$ is represented when the gripper is open, while on the left hand the positions of these parts and of the gripper when closed are shown. The gripper is open when the shuttle-beak is pressed in among the stalks by the forward motion of the lathe, and consequently a stalk will enter between the gripper-jaws $a'\,c$.

To the breast-beam a rod, $e'$, is attached, on which an adjustable stop, $e$, is arranged. The shuttle-box R' is provided at its side with an opening, G, (see Figs. 3 and 5,) through which this stop-pin $e$ can have access to the stud $g$, attached to the catch $b$ in the shuttle and projecting through a hole in the side of said shuttle A. At the time the grip at the end of the shuttle is to be opened the stud $g$ in the forward movement of the lathe will come against the stop-pin $e$, whereby the stud $g$, together with the catch $b$, is pushed backward, thus freeing the catch $b$ from the projection $c^2$ of plate $c$, when this plate $c$ is forced outward by its spring $f$, so as to grip the stalk between its end and the fixed jaw-plate $a'$. The stop $e$ can easily be adjusted by means of two nuts, one on each side of the rod $e'$. The lathe, together with the shuttle, is then moved backward, causing the shuttle to draw the stalk out of the box C in a nearly-radial direction, whereupon the picker $t$, mounted on the rod T, (see Figs. 2, 3, and 5,) enters the recess H on top of the shuttle, and, striking against the surface H', drives the shuttle in the opposite direction through the shed until the same arrives at the opposite shuttle-box R'. The shuttle A is stopped by its inclined surface $i'$ coming in contact with a nose on the stop-lever $i$, pivoted to the front side of the shuttle-box R, (see Figs. 3 and 8,) and the rebound of the shuttle is prevented by a well-known shuttle-brake, $r$. The lathe has by this time completed its back motion and performed part of its forward motion, and the gripper at the end of the shuttle must now be made to open and to release the stalk.

This operation is produced as follows: In the lower part of the shuttle-race is an elbow-lever, $d$, Figs. 7 and 9, the upper arm of which projects through a slot in the shuttle-box into the shuttle when its horizontal arm, which is connected to a rod, $d^2$, is moved upward by said rod. This is effected by the motion of the lathe, which causes the roller $d^3$ on the end of the rod $d^2$ to run up upon the inclined surface $h$, fixed to the breast-beam B, by means of the rod or bar $h'$. By the raising of the rod $d^2$ the upper arm of the elbow-lever $d$ will be moved so as to enter the shuttle-box and pass into the shuttle A just in front of the projection $c'$ of the plate $c$, and moves thereby the plate $c$ against the action of its spring $f$, toward the middle of the shuttle, and thus effects the opening of the gripper-jaws. A spring, $d'$, draws the lever $d$ back again during the back motion of the lathe, whereby it will be drawn clear of the shuttle-box when the shuttle is thrown. The plate $c$ is then held in this back position by the action of the catch $b$ engaging the projection $c^2$, as above described, and the above-mentioned operation is repeated—that is to say, the shuttle, with the gripper-jaw open, is pressed by the forward motion of the lathe against the mass of stalks in the box C. The gripper is then made to close by the action of the bolt $e$ upon the pin $d$, attached to the catch $b$. The shuttle holding the stalk is then thrown through the shed and caught in the opposite shuttle-box, and the stalk is released from the gripper by the action of the lever $d$ against the projection $c'$ of the plate $c$, whereby the gripper is opened.

In order that the loom may be stopped by the ordinary shuttle stop-motion, if the shuttle should not pass sufficiently far in the box, and consequently its gripper not penetrate sufficiently far beyond the end of the same, the following mechanism is employed:

The arm $o^2$ of the protector-rod $o$ does not bear, as usual, by means of the foot-lever upon the shuttle-box brake $r$, but bears on a nut fast on the rod $l'$, pivoted to one end of a double-ended lever, $l$, mounted on the lathe-beam. The other end of this lever $l$ projects into the shuttle-box R', and is provided with a roller, $l^2$, (see Figs. 3 and 4,) so that on the entrance of the shuttle this lever is pressed down, whereby the rod $l'$ and arm $o^2$ are raised to such an extent that arm $o^2$ can pass freely over the ordinary striking-stud, $q$. (See Fig. 1.) If, on the other hand, the shuttle does not pass quite into the shuttle-box, and consequently does not depress the lever $l$, then the arm $o^2$ will come in contact with this striking-stud $q$, and will effect the stopping of the loom in the usual manner.

In order that a sufficient quantity of stalks may always be presented to the shuttle-gripper, a continuous or intermittent rotary motion is imparted to the stalk-box C, by means of a ratchet-wheel, R, attached to the axis of the stalk-box C and operated through bar $w$, connecting-rod $st$, and crank $x$, attached to the loom-shaft $w'$.

What I claim is—

1. In combination with the shuttle-body, the fixed plate $a'$, and movable jaw-plate $c$, formed with projections $c'$ and $c^2$, spring $f$, catch $b$, and the spring $g'$, substantially as described.

2. In combination with a shuttle-body, the fixed plate $a'$, movable jaw-plate $c$, catch $b$, pin $g$, and spring $g'$, and fixed bolt $e$, rod $e'$, breast-beam B, spring $f$, and the lathe, substantially as set forth.

3. In combination with a shuttle-body and movable jaw-plate, $c$, having projection $c'$, the elbow-lever $d$, situated in the shuttle-race, rod $d^2$, roller $d^3$, and inclined surface $h$, bar $h'$, breast-beam B, spring $f$, and the lathe, substantially as set forth.

In testimony whereof I have signed my name to this specification in the presence of two subscribing witnesses.

P. DE HEMPTINNE.

Witnesses:
H. HARBINS,
H. SEVERANE.